(12) United States Patent
Kamikihara et al.

(10) Patent No.: US 10,141,786 B2
(45) Date of Patent: Nov. 27, 2018

(54) POWER RECEIVING DEVICE

(71) Applicant: TOYOTA JIDOSHA KABUSHIKI KAISHA, Toyota-shi, Aichi-ken (JP)

(72) Inventors: Daisuke Kamikihara, Toyota (JP); Shinji Ichikawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 15/118,270

(22) PCT Filed: Feb. 17, 2015

(86) PCT No.: PCT/IB2015/000178
§ 371 (c)(1),
(2) Date: Aug. 11, 2016

(87) PCT Pub. No.: WO2015/173614
PCT Pub. Date: Nov. 19, 2015

(65) Prior Publication Data
US 2016/0359368 A1 Dec. 8, 2016

(30) Foreign Application Priority Data
Feb. 20, 2014 (JP) .................... 2014-030568

(51) Int. Cl.
*H02J 50/12* (2016.01)
*H02J 50/80* (2016.01)
(Continued)

(52) U.S. Cl.
CPC ............ *H02J 50/12* (2016.02); *B60L 11/182* (2013.01); *H02J 5/005* (2013.01); *H02J 7/025* (2013.01);
(Continued)

(58) Field of Classification Search
CPC ........ B60L 11/182; H02J 5/005; H02J 7/025; H02J 50/12; H02J 50/70; H02J 7/027;
(Continued)

(56) References Cited

U.S. PATENT DOCUMENTS 5,914,866 A * 6/1999 Eguchi ................ H02M 7/4807
363/131
6,760,233 B2 * 7/2004 Tolle .................... H02M 3/337
363/16
(Continued)

FOREIGN PATENT DOCUMENTS

JP 2013-110822 A 6/2013
JP 2013-126327 A 6/2013
(Continued)

*Primary Examiner* — Alfonso Perez Borroto
*Assistant Examiner* — Esayas Yeshaw
(74) *Attorney, Agent, or Firm* — Oliff PLC

(57) ABSTRACT

In a power receiving device, a module including a power receiving unit, a transformer, a filter circuit and a rectifier circuit includes a coil and a capacitor. An alternating-current power supply unit is configured to be able to supply alternating current to the power receiving device on a side closer to the power receiving unit than a relay. A vehicle electronic control unit is configured to, when alternating current is supplied from the alternating-current power supply unit in a case where the relay is turned off, detect whether there is an abnormality in at least one of the coil or the capacitor on the basis of a detected value of a current sensor.

8 Claims, 12 Drawing Sheets

(51) Int. Cl.
  *B60L 11/18* (2006.01)
  *H02J 5/00* (2016.01)
  *H02J 7/02* (2016.01)
  *H02J 50/70* (2016.01)
  *H02J 7/04* (2006.01)
  *H02J 7/34* (2006.01)

(52) U.S. Cl.
  CPC .............. *H02J 7/027* (2013.01); *H02J 7/045* (2013.01); *H02J 7/345* (2013.01); *H02J 50/70* (2016.02); *H02J 50/80* (2016.02); *Y02T 10/7005* (2013.01); *Y02T 10/7072* (2013.01); *Y02T 90/122* (2013.01); *Y02T 90/14* (2013.01)

(58) Field of Classification Search
  CPC . H02J 7/045; H02J 7/345; H02J 50/80; Y02T 10/7005; Y02T 10/7072; Y02T 90/14; Y02T 90/122
  See application file for complete search history.

(56) References Cited

U.S. PATENT DOCUMENTS

| | | | | |
|---|---|---|---|---|
| 2009/0096413 | A1* | 4/2009 | Partovi | H01F 5/003 320/108 |
| 2009/0308675 | A1* | 12/2009 | Sato | B60L 11/123 180/65.285 |
| 2012/0104867 | A1* | 5/2012 | Mudrick | H02J 7/025 307/104 |
| 2012/0153717 | A1* | 6/2012 | Obayashi | B60L 11/1816 307/9.1 |
| 2012/0306439 | A1* | 12/2012 | Ichikawa | B60L 11/123 320/108 |
| 2013/0127409 | A1 | 5/2013 | Ichikawa | |
| 2013/0127413 | A1* | 5/2013 | Ohtomo | B60L 3/003 320/109 |
| 2013/0154384 | A1* | 6/2013 | Nakamura | H01F 38/14 307/104 |
| 2013/0193749 | A1 | 8/2013 | Nakamura et al. | |
| 2013/0293192 | A1* | 11/2013 | Abe | B60L 11/123 320/108 |
| 2014/0077616 | A1* | 3/2014 | Baarman | H02J 5/005 307/104 |
| 2014/0191720 | A1* | 7/2014 | Sugiyama | B60L 3/0069 320/109 |
| 2014/0253027 | A1* | 9/2014 | Obayashi | H02J 7/025 320/108 |
| 2015/0008877 | A1 | 1/2015 | Ichikawa et al. | |

FOREIGN PATENT DOCUMENTS

| | | |
|---|---|---|
| JP | 2013-135572 A | 7/2013 |
| JP | 2013-146148 A | 7/2013 |
| JP | 2013-146154 A | 7/2013 |
| JP | 2013-154815 A | 8/2013 |
| JP | 2013-169132 A | 8/2013 |
| JP | 2015-080296 A | 4/2015 |

* cited by examiner

POWER RECEIVING DEVICE

BACKGROUND OF THE INVENTION

1. Field of the Invention

The invention relates to a power receiving device and, more particularly, to a power receiving device that contactlessly receives electric power that is output from a power transmitting device.

2. Description of Related Art

A power transfer system that contactlessly transfers electric power from a power transmitting device to a power receiving device has become a focus of attention. Japanese Patent Application Publication No. 2013-169132 (JP 2013-169132 A) describes an electromotive vehicle on which such a power receiving device is mounted. The power receiving device includes a power receiving unit (resonator) formed of a coil and a capacitor. Other than the power receiving unit (resonator), the power receiving device further includes a device unit, such as a rectifier and a filter, and a sensor unit that detects a received voltage or a received current (see JP 2013-169132 A).

As described above, the power receiving device includes the device unit, such as the rectifier and the filter, together with the power receiving unit (resonator); however, in JP 2013-169132 A, a method for detecting whether there is an abnormality in the power receiving device including various devices is not particularly studied. An abnormality of the power receiving device may be able to be detected based on a detected value of received voltage or received current at the time when the power receiving device is receiving electric power from the power transmitting device; however, it is desirable to be able to detect whether there is an abnormality in the power receiving device by the power receiving device alone (vehicle alone) irrespective of whether there is a power transmitting device.

The power receiving device generally includes a plurality of capacitors and a plurality of coils, and it is desirable to be able to also detect an abnormality, such as a crack of a core, of any one of the coils together with an abnormality, such as aged degradation, of any one of the capacitors.

SUMMARY OF THE INVENTION

The invention provides a power receiving device that contactlessly receives electric power that is output from a power transmitting device, that is able to detect whether there is an abnormality in the power receiving device by the power receiving device alone and that is able to also detect an abnormality in a capacitor or a coil in the power receiving device.

An aspect of the invention provides a power receiving device including a module, a first relay, an alternating-current power supply unit, a current sensor, and an electronic control unit. The module includes a power receiving unit and a device unit. The power receiving unit includes a coil and a capacitor. The power receiving unit is configured to contactlessly receive electric power that is output from a power transmitting device. The device unit includes a coil and a capacitor. The device unit is provided between the power receiving unit and an electrical storage device. The electrical storage device is configured to store electric power received by the power receiving unit. The first relay is provided between the device unit and the electrical storage device. The alternating-current power supply unit is configured to supply alternating current to a power line provided closer to the power receiving unit than the first relay. The current sensor is configured to detect a current flowing through the power line. The electronic control unit is configured to, when alternating current is supplied from the alternating-current power supply unit to the power line in a case where the first relay is in a power interrupted state, detect whether there is an abnormality in at least one of the coil or the capacitor based on a detected value of the current sensor.

With the above power receiving device, the alternating-current power supply unit that is able to supply alternating current to the power line provided closer to the power receiving unit than the first relay is provided. The alternating-current power supply unit supplies alternating current, so the power receiving device alone can detect whether there is an abnormality in the power receiving device even when electric power is not being received from the power transmitting device. Because alternating current is supplied by the alternating-current power supply unit, an abnormality of the coil can be detected based on a change in the impedance of the coil. Thus, with the power receiving device, the power receiving device alone is able to detect whether there is an abnormality in the power receiving device, and is also able to detect an abnormality in any one of the coils together with an abnormality in any one of the capacitors.

In the power receiving device, the power receiving device may further include a second relay. The second relay may be provided between the power receiving unit and the device unit. The coil may include a first coil provided in the device unit. The capacitor may include a first capacitor provided in the device unit. The alternating-current power supply unit may be electrically connected between the first relay and the second relay. The current sensor may be configured to detect a current flowing through a power line provided between the first relay and the second relay. The electronic control unit may be configured to, when alternating current is supplied from the alternating-current power supply unit in a case where the first relay and the second relay are in a power interrupted state, detect whether there is an abnormality in at least one of the first coil or the first capacitor based on the detected value of the current sensor.

With the above power receiving device, the power receiving unit is electrically isolated from the device unit by the second relay, and it is detected whether there is an abnormality in at least one of the first coil or first capacitor of the device unit. Thus, with the power receiving device, it is possible to detect whether there is an abnormality in the device unit as distinguished from the power receiving unit.

In the power receiving device, the coil may further include a second coil provided in the power receiving unit. The capacitor may further include a second capacitor provided in the power receiving unit. The electronic control unit may be configured to, after the electronic control unit detects that there is no abnormality in the first coil or the first capacitor, set the second relay in an energized state and detect whether there is an abnormality in at least one of the second coil or the second capacitor based on the detected value of the current sensor.

With the above power receiving device, it is possible to further detect whether there is an abnormality in the power receiving unit as distinguished from the device unit.

In the power receiving device, the device unit may include a rectifier circuit and a filter circuit. The rectifier circuit may be configured to rectify electric power received by the power receiving unit. The filter circuit may be provided between the power receiving unit and the rectifier circuit. The first coil and the first capacitor may be included in the filter circuit. The capacitor may further include a third capacitor provided in the rectifier circuit. The current sensor may include a first current sensor and a second current sensor. The first current sensor may be configured to detect a current flowing through a power line provided between the second relay and the rectifier circuit. The second current sensor may be configured to detect a current flowing through a power line provided between the rectifier circuit and the first relay. The alternating-current power supply unit may be electrically connected to a power line provided between the second relay and the filter circuit. The electronic control unit may be configured to detect whether there is an abnormality in the filter circuit or the power receiving unit based on a detected value of the first current sensor. The electronic control unit is configured to detect whether there is an abnormality in the rectifier circuit based on a detected value of the second current sensor.

With the above power receiving device, when the second relay is in a power interrupted state, it is possible to detect whether there is an abnormality in the filter circuit based on the detected value of the first current sensor. When the second relay is in an energized state, it is possible to detect whether there is an abnormality in the power receiving unit based on the detected value of the first current sensor. In addition, it is possible to detect whether there is an abnormality in the rectifier circuit based on the detected value of the second current sensor. Thus, with the power receiving device, it is possible to detect whether there is an abnormality while distinguishing the filter circuit, the power receiving unit and the rectifier circuit from one another.

In the power receiving device, the device unit may include a rectifier circuit and a filter circuit. The rectifier circuit may be configured to rectify electric power received by the power receiving unit. The filter circuit may be provided between the power receiving unit and the rectifier circuit. The first coil and the first capacitor may be included in the filter circuit. The capacitor may further include a third capacitor provided in the rectifier circuit. The current sensor may include a first current sensor and a second current sensor. The first current sensor may be configured to detect a current flowing through a power line provided between the second relay and the rectifier circuit. The second current sensor may be configured to detect a current flowing through a power line provided between the rectifier circuit and the first relay. The alternating-current power supply unit may be electrically connected to a power line provided between the filter circuit and the rectifier circuit. The electronic control unit may be configured to detect whether there is an abnormality in the filter circuit or the power receiving unit based on a detected value of the first current sensor. The electronic control unit may be configured to detect whether there is an abnormality in the rectifier circuit based on a detected value of the second current sensor.

With the above power receiving device, it is possible to further detect whether there is an abnormality while distinguishing the filter circuit, the power receiving unit and the rectifier circuit from one another.

In the power receiving device, the device unit may include a rectifier circuit and a filter circuit. The rectifier circuit may be configured to rectify electric power received by the power receiving unit. The filter circuit may be provided between the power receiving unit and the rectifier circuit. The first coil and the first capacitor may be included in the filter circuit. The capacitor may further include a third capacitor provided on an output side of a rectifier of the rectifier circuit. The current sensor may include a first current sensor and a second current sensor. The first current sensor may be configured to detect a current flowing through a power line provided between the second relay and the rectifier circuit. The second current sensor may be configured to detect a current flowing through a power line provided between the rectifier circuit and the first relay. The alternating-current power supply unit may be electrically connected to the power line provided between the rectifier circuit and the first relay. The power receiving device may further include a bypass circuit and a third relay. The bypass circuit may be configured to bypass the rectifier circuit. The third relay may be provided in the bypass circuit. The electronic control unit may be configured to detect whether there is an abnormality in the third capacitor based on a detected value of the second current sensor while setting the third relay in a power interrupted state, and the electronic control unit may be configured to detect whether there is an abnormality in the filter circuit or the power receiving unit based on a detected value of the first current sensor while setting the third relay in an energized state.

With the above power receiving device, when the third relay is in a power interrupted state, it is possible to detect whether there is an abnormality in the third capacitor of the rectifier circuit based on the detected value of the second current sensor. When the third relay is in an energized state and the second relay is in a power interrupted state, it is possible to detect whether there is an abnormality in the filter circuit based on the detected value of the first current sensor. When the second relay and the third relay are in an energized state, it is possible to detect whether there is an abnormality in the power receiving unit based on the detected value of the first current sensor. Thus, with the power receiving device as well, it is possible to detect whether there is an abnormality while distinguishing the filter circuit, the power receiving unit and the rectifier circuit from one another.

In the power receiving device, the alternating-current power supply unit may be configured to change a frequency of the alternating current. The electronic control unit may be configured to detect whether there is an abnormality in the coil or the capacitor based on the detected values of the current sensor for alternating currents respectively having different frequencies.

With the above power receiving device, because abnormality detection is carried out while changing the frequency of the alternating current, it is possible to detect such an abnormality that the synthetic impedance of the coil and the capacitor indicates a normal value irrespective of the fact that both the coil and the capacitor are abnormal.

In the power receiving device, the device unit may include a rectifier circuit, a filter circuit and an isolation transformer. The rectifier circuit may be configured to rectify electric power received by the power receiving unit. The filter circuit may be provided between the power receiving unit and the rectifier circuit. The isolation transformer may be provided between the power receiving unit and the filter circuit.

With the above power receiving device, it is possible to further detect whether there is an abnormality in the isolation transformer.

According to the invention, in the power receiving device that contactlessly receives electric power that is output from the power transmitting device, it is possible to detect whether there is an abnormality in the power receiving device by the power receiving device alone, and it is also possible to detect whether there is an abnormality in the coil together with an abnormality in the capacitor, the coil and the capacitor being included in the power receiving device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
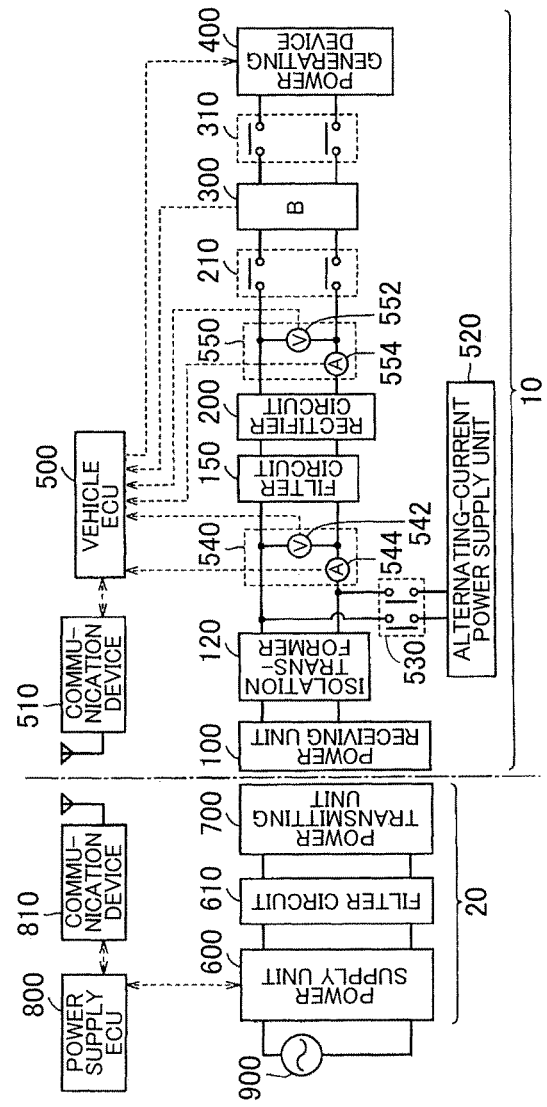
FIG. 1 is an overall configuration view of a power transfer system according to a first embodiment of the invention.

Hereinafter, embodiments of the invention will be described in detail with reference to the accompanying drawings. The plurality of embodiments will be described below; however, appropriate combinations of the configurations described in the embodiments are expected at the time of filing. Like reference numerals denote the same or corresponding portions in the drawings, and the description thereof will not be repeated.

Initially, a first embodiment will be described. FIG. 1 is an overall configuration view of a power transfer system according to the first embodiment of the invention. As shown in FIG. 1, the power transfer system includes a vehicle 10 and a power transmitting device 20. The power transmitting device 20 is provided outside the vehicle 10, and is able to charge an electrical storage device 300 mounted on the vehicle 10 (hereinafter, charging of the electrical storage device 300 of the vehicle 10 from the power transmitting device 20 provided outside the vehicle is also referred to as "external charging").

The vehicle 10 includes a power receiving unit 100, an isolation transformer 120, a filter circuit 150, a rectifier circuit 200, the electrical storage device 300, a power generating device 400, a vehicle electronic control unit (ECU) 500 and a communication device 510. The vehicle 10 further includes a relay 210, a system main relay (SMR) 310, an alternating-current power supply unit 520, a relay 530, and sensor units 540, 550.

The power receiving unit 100, the isolation transformer 120, the filter circuit 150 and the rectifier circuit 200 constitute an example of a "module" according to the invention. Of these, the isolation transformer 120, the filter circuit 150 and the rectifier circuit 200 constitute an example of a "device unit" according to the invention.

The power receiving unit 100 includes a resonator (a coil and a capacitor) for contactlessly receiving electric power (alternating-current) that is output from a power transmitting unit 700 of the power transmitting device 20. The power receiving unit 100 is, for example, provided at the lower portion of a vehicle body near the front of the vehicle body. The power transmitting device 20 is provided on the ground or in the ground.

The isolation transformer 120 is provided between the power receiving unit 100 and the filter circuit 150, and electrically insulates the power receiving unit 100 from devices downstream of the filter circuit 150. The isolation transformer 120 is not an indispensable component in the vehicle 10, and is provided where necessary.

The filter circuit 150 is provided between the isolation transformer 120 and the rectifier circuit 200, and suppresses harmonic noise that arises upon reception of electric power by the power receiving unit 100. The filter circuit 150 is formed of an LC filter including a coil and a capacitor. A specific configuration of the filter circuit 150 will be described later.

The rectifier circuit 200 rectifies alternating-current power received by the power receiving unit 100, and outputs the rectified electric power to the electrical storage device 300. The rectifier circuit 200 includes a smoothing capacitor together with a rectifier. A specific configuration of the rectifier circuit 200 will also be described later.

The electrical storage device 300 is a rechargeable direct-current power supply, and is formed of, for example, a secondary battery, such as a lithium ion battery and a nickel-metal hydride battery. The voltage of the electrical storage device 300 is, for example, about 200 V. The electrical storage device 300 stores not only electric power that is output from the rectifier circuit 200 but also electric power that is generated by the power generating device 400. The electrical storage device 300 supplies the stored electric power to the power generating device 400.

The power generating device 400 generates driving force for propelling the vehicle 10 by using electric power that is stored in the electrical storage device 300. Although not specifically shown in the drawing, the power generating device 400, for example, includes an inverter, a motor, drive wheels, and the like. The inverter receives electric power from the electrical storage device 300. The motor is driven by the inverter. The drive wheels are driven by the motor. The power generating device 400 may include a generator and an engine. The generator is used to charge the electrical storage device 300. The engine is able to drive the generator.

The relay 210 is provided between the rectifier circuit 200 and the electrical storage device 300. The relay 210 is turned on by the vehicle ECU 500 when the electrical storage device 300 is externally charged from the power transmitting device 20. On the other hand, when the process of detecting an abnormality in the power receiving device, which is executed in advance of external charging, is executed, the relay 210 is turned off. The SMR 310 is provided between the electrical storage device 300 and the power generating device 400. The SMR 310 is turned on by the vehicle ECU 500 when start-up of the power generating device 400 is required.

The sensor unit 540 is provided between the isolation transformer 120 and the filter circuit 150. The sensor unit 540 includes a voltage sensor 542 and a current sensor 544. The voltage sensor 542 detects a voltage between a pair of power lines provided between the isolation transformer 120 and the filter circuit 150, and outputs the detected value to the vehicle ECU 500. The current sensor 544 detects a current flowing through the pair of power lines between the isolation transformer 120 and the filter circuit 150, and outputs the detected value to the vehicle ECU 500. The sensor unit 540 may be provided between the filter circuit 150 and the rectifier circuit 200.

The sensor unit 550 is provided between the rectifier circuit 200 and the relay 210. The sensor unit 550 includes a voltage sensor 552 and a current sensor 554. The voltage sensor 552 detects an output voltage of the rectifier circuit 200, and outputs the detected value to the vehicle ECU 500. The current sensor 554 detects an output current of the rectifier circuit 200, and outputs the detected value to the vehicle ECU 500.

The power receiving device includes the alternating-current power supply unit 520, the isolation transformer 120, the filter circuit 150, the rectifier circuit 200 and the vehicle ECU 500 (the vehicle ECU is also simply referred to as ECU). The alternating-current power supply unit 520 is connected to the pair of power lines between the isolation transformer 120 and the filter circuit 150 via the relay 530. The alternating-current power supply unit 520 generates alternating current, and passes the alternating current to the power receiving unit 100, the isolation transformer 120, the filter circuit 150 and the rectifier circuit 200. The ECU 500 detects whether there is an abnormality in any one of these components, that is, the ECU 500 detects whether there is an abnormality in the power receiving device (the power receiving device described in association with whether there is an abnormality in the power receiving device means the power receiving device excluding the alternating-current power supply unit 520, and the same applies to the following description). It is possible to detect whether there is an abnormality in the power receiving device based on detected values of the sensor units 540, 550 at the time when alternating current is passed to the power receiving device by the alternating-current power supply unit 520 in a state where the power receiving device is electrically isolated from the electrical storage device 300 by turning off the relay 210. That is, in the first embodiment, the alternating-current power supply unit 520 that is able to supply alternating current to the power receiving device is provided in the vehicle 10, and it is possible to detect whether there is an abnormality in the power receiving device by the vehicle alone before the start of power transfer from the power transmitting device 20 to the vehicle 10.

The relay 530 is provided between the alternating-current power supply unit 520 and the pair of power lines between the isolation transformer 120 and the filter circuit 150. The relay 530 is turned on by the vehicle ECU 500 when the process of detecting whether there is an abnormality in the power receiving device is executed, and is turned off during external charging of the electrical storage device 300 by the power transmitting device 20.

The vehicle ECU 500 includes a central processing unit (CPU), a storage device, an input/output buffer, and the like (all of which are not shown). The vehicle ECU 500 receives signals input from various sensors or outputs control signals to various devices, and controls the devices in the vehicle 10. As an example, the vehicle ECU 500 executes traveling control over the vehicle 10, charging control over the electrical storage device 300, and the like. As major control of the vehicle ECU 500 according to the invention, the vehicle ECU 500 executes an abnormality detection process. In the abnormality detection process, it is detected whether there is an abnormality in the power receiving device for contactlessly receiving electric power from the power transmitting device 20.

When the electrical storage device 300 is charged from the power transmitting device 20, the vehicle ECU 500 communicates with the power transmitting device 20 by using the communication device 510, and exchanges information about start/stop of charging, a power receiving condition of the vehicle 10, and the like, with the power transmitting device 20.

On the other hand, the power transmitting device 20 includes a power supply unit 600, a filter circuit 610, the power transmitting unit 700, a power supply ECU 800 and a communication device 810. The power supply unit 600 receives electric power from an external power supply 900, such as a commercial system power supply, and generates alternating-current power having a predetermined transmission frequency.

The power transmitting unit 700 includes a resonator (a coil and a capacitor) for contactlessly transmitting electric power to the power receiving unit 100 of the vehicle 10. The power transmitting unit 700 receives alternating-current power having the transmission frequency from the power supply unit 600, and contactlessly transmits electric power to the power receiving unit 100 of the vehicle 10 via an electromagnetic field that is generated around the power transmitting unit 700. A specific configuration of the power transmitting unit 700 will be described later together with the power receiving unit 100.

The filter circuit 610 is provided between the power supply unit 600 and the power transmitting unit 700, and suppresses harmonic noise that arises from the power supply unit 600. The filter circuit 610 is formed of an LC filter including a coil and a capacitor.

The power supply ECU 800 includes a CPU, a storage device, an input/output buffer, and the like (all of which are not shown). The power supply ECU 800 receives signals input from various sensors or outputs control signals to various devices, and controls the devices in the power transmitting device 20. As an example, the power supply ECU 800 executes switching control over the power supply unit 600 so that the power supply unit 600 generates alternating-current power having the transmission frequency.

When the electrical storage device 300 is charged as a result of transmission of electric power from the power transmitting device 20 to the electrical storage device 300, the power supply ECU 800 communicates with the vehicle 10 by using the communication device 810, and exchanges information about start/stop of charging, a power receiving condition of the vehicle 10, and the like, with the vehicle 10.

In the power transfer system, alternating-current power having the predetermined transmission frequency is supplied from the power supply unit 600 to the power transmitting unit 700 via the filter circuit 610 in the power transmitting device 20. Each of the power transmitting unit 700 and the power receiving unit 100 of the vehicle 10 includes the resonator (the coil and the capacitor), and is designed to resonate with each other at the transmission frequency. A Q value indicating the resonant strength of the power transmitting unit 700 and power receiving unit 100 is desirably higher than or equal to 100.

When alternating-current power is supplied from the power supply unit 600 to the power transmitting unit 700, energy (electric power) is transferred from the power transmitting unit 700 to the power receiving unit 100 through an electromagnetic field that is formed between the coil of the power transmitting unit 700 and the coil of the power receiving unit 100. Energy (electric power) transferred to the power receiving unit 100 is supplied to the electrical storage device 300, via the isolation transformer 120, the filter circuit 150 and the rectifier circuit 200.

Figure 2:
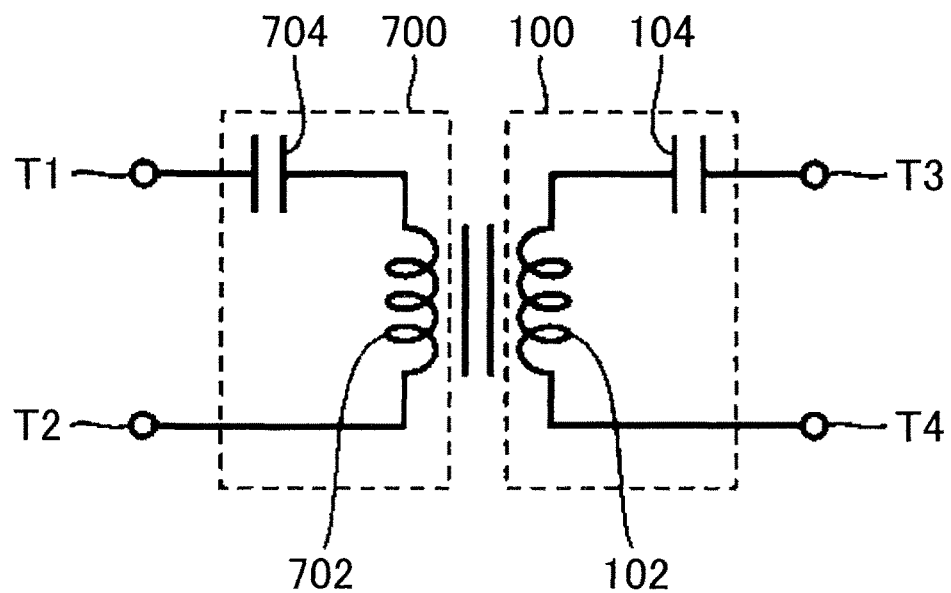
FIG. 2 is a view that shows an example of the circuit configuration of each of a power receiving unit and a power transmitting unit that are shown in FIG. 1.

FIG. 2 is a view that shows an example of the circuit configuration of each of the power receiving unit 100 and the power transmitting unit 700 that are shown in FIG. 1. As shown in FIG. 2, the power receiving unit 100 includes a coil 102 and a capacitor 104. The capacitor 104 is connected in series with the coil 102, and forms a resonant circuit with the coil 102. The capacitor 104 is provided in order to adjust the resonant frequency of the power receiving unit 100. The capacitor 104 may be connected in parallel with the coil 102. Alternatively, together with the capacitor 104 connected in series with the coil 102, a capacitor connected in parallel with the coil 102 may be further provided. If a desired resonant frequency is obtained by utilizing the stray capacitance of the coil 102, a configuration having no capacitor is applicable.

The power transmitting unit 700 includes a coil 702 and a capacitor 704. The capacitor 704 is connected in series with the coil 702, and forms a resonant circuit with the coil 702. The capacitor 704 is provided in order to adjust the resonant frequency of the power transmitting unit 700. The capacitor 704 may also be connected in parallel with the coil 702. Alternatively, together with the capacitor 704 connected in series with the coil 702, a capacitor connected in parallel with the coil 702 may be further provided. When a desired resonant frequency is obtained by utilizing the stray capacitance of the coil 702, a configuration having no capacitor is applicable.

Figure 3:
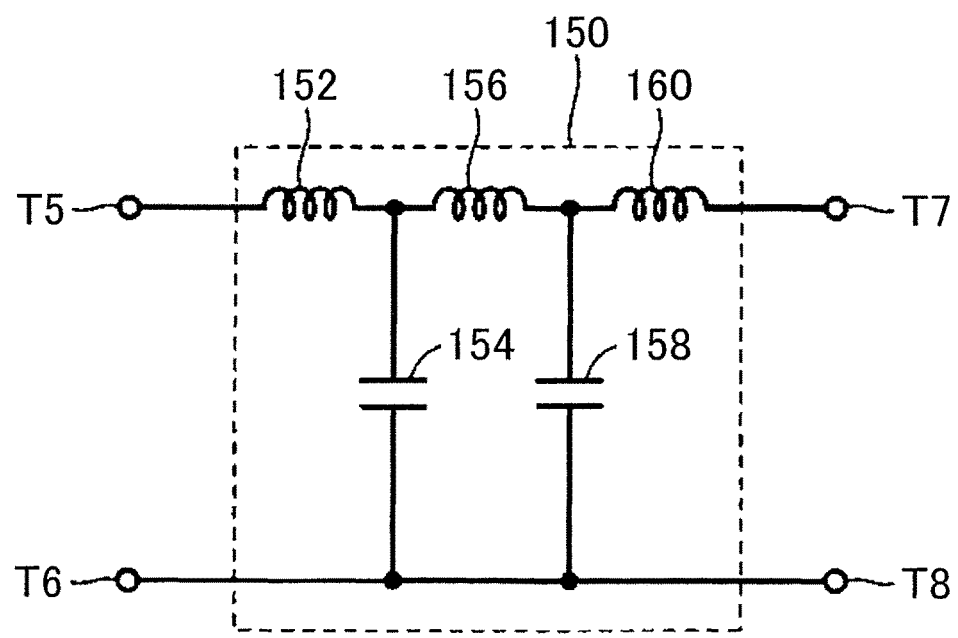
FIG. 3 is a view that shows an example of the circuit configuration of a filter circuit shown in FIG. 1.

FIG. 3 is a view that shows an example of the circuit configuration of the filter circuit 150 shown in FIG. 1. As shown in FIG. 3, the filter circuit 150 includes coils 152, 156, 160 and capacitors 154, 158. The coils 152, 156, 160 are provided in one of the pair of power lines between the isolation transformer 120 (FIG. 1) and the rectifier circuit 200. In the first embodiment, the coils 152, 156, 160 are connected in series between terminals T5, T7. The capacitor 154 is connected between the pair of power lines between the coils 152, 156. The capacitor 158 is connected between the pair of power lines between the coils 156, 160.

Although not shown in the drawing, part of the coils 152, 156, 160 may be provided separately in the power line between terminals T6, T8. The arrangement and number of coils and capacitors that constitute the filter circuit 150 are not limited to those shown in FIG. 3, and may be changed as needed in accordance with performance that is required of the filter circuit 150. For example, the filter circuit 150 may be formed of a fourth-order LC filter including the coils 152, 156 and the capacitors 154, 158 or including the coils 156, 160 and the capacitors 154, 158, or may be formed a third-order LC filter including the coils 152, 156 and the capacitor 154.

Figure 4:
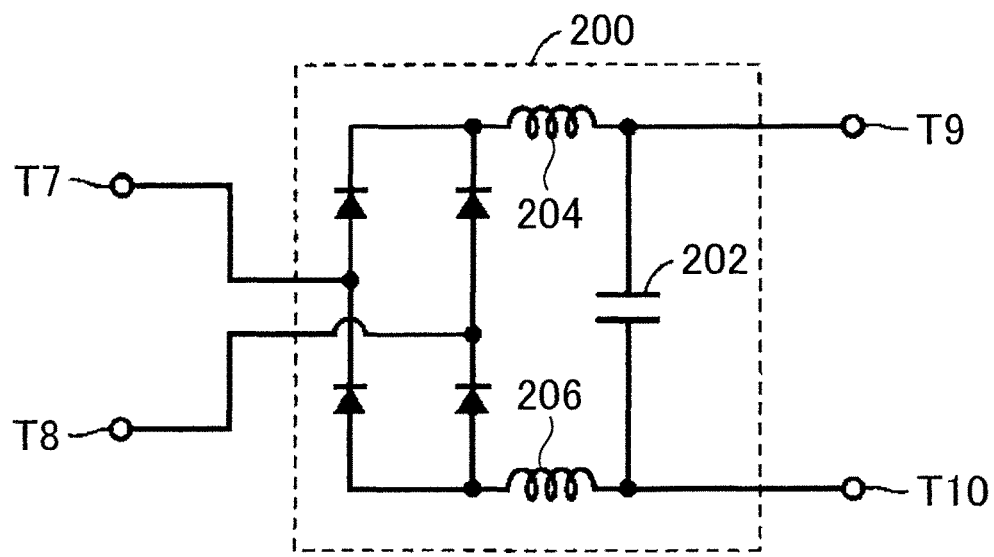
FIG. 4 is a view that shows an example of the circuit configuration of a rectifier circuit shown in FIG. 1.

FIG. 4 is a view that shows an example of the circuit configuration of the rectifier circuit 200 shown in FIG. 1. As shown in FIG. 4, the rectifier circuit 200 includes a rectifier, a capacitor 202, and choke coils 204, 206. The capacitor 202 is provided on the output side of the rectifier. The choke coils 204, 206 are inserted between the rectifier and the capacitor 202. The rectifier is formed of, for example, a diode bridge circuit including four diodes. The choke coils 204, 206 do not need to be provided. Alternating-current power passing through the filter circuit 150 (FIG. 1) is rectified by the rectifier into direct-current power, the direct-current power is smoothed by the capacitor 202, and the smoothed direct-current power is output to the electrical storage device 300 (FIG. 1).

Figure 5:
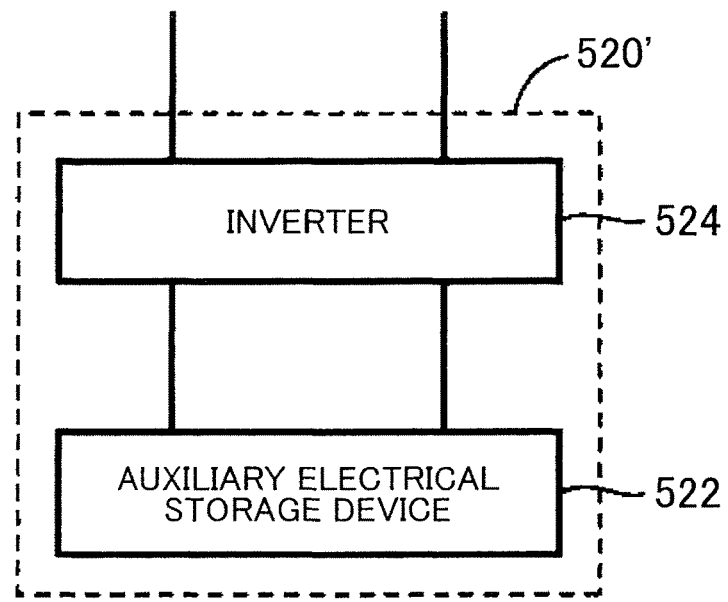
FIG. 5 is a view that shows a first configuration example of an alternating-current power supply unit shown in FIG. 1.

FIG. 5 is a view that shows a configuration example of the alternating-current power supply unit 520' shown in FIG. 1. As shown in FIG. 5, the alternating-current power supply unit 520 includes an auxiliary electrical storage device 522 and an inverter 524. The auxiliary electrical storage device 522 is a direct-current power supply that serves as a power supply for the vehicle ECU 500 and various auxiliaries mounted on the vehicle 10. The auxiliary electrical storage device 522 is formed of, for example, a secondary battery, such as a lead acid battery and a nickel-metal hydride battery. The voltage of the auxiliary electrical storage device 522 is, for example, 12 V or 36 V.

The inverter 524 converts direct current, which is output from the auxiliary electrical storage device 522, to alternating current, and supplies the alternating current to the power receiving device. The inverter 524 is formed of, for example, a single-phase bridge circuit.

Figure 6:
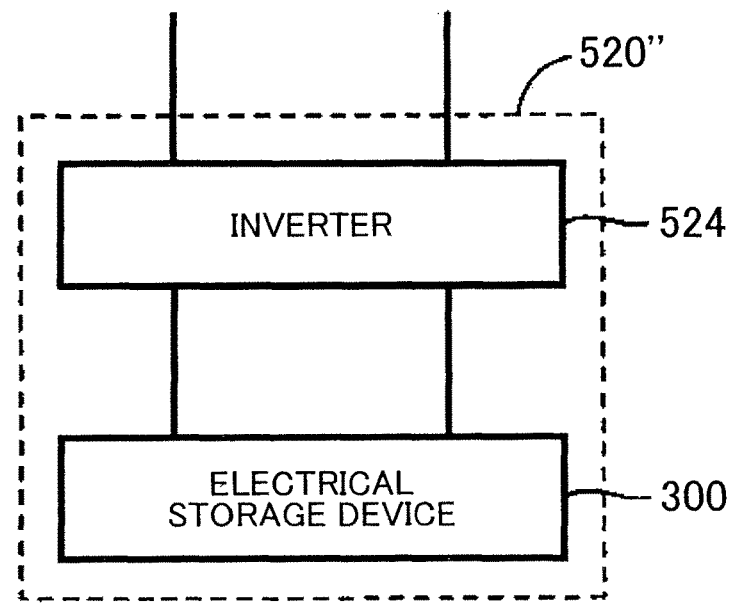
FIG. 6 is a view that shows a second configuration example of an alternating-current power supply unit shown in FIG. 1.
Figure 7:
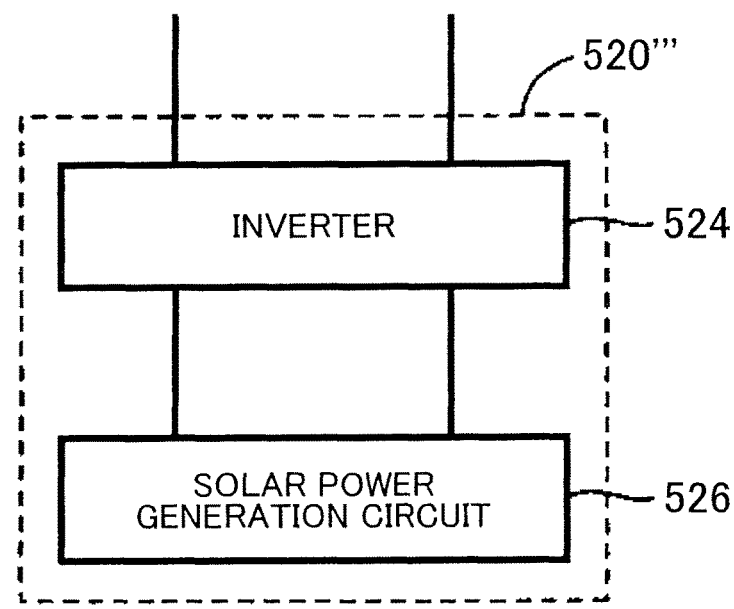
FIG. 7 is a view that shows a third configuration example of an alternating-current power supply unit shown in FIG. 1.

As shown in FIG. 6, an alternating-current power supply unit 520" corresponding to the alternating-current power supply unit 520" shown in FIG. 5 may be formed of the electrical storage device 300 (FIG. 1) and the inverter 524. As shown in FIG. 7, an alternating-current power supply unit 520''' may be formed of a solar power generation circuit 526 and the inverter 524. The solar power generation circuit 526 generates electric power by using a solar panel provided on a moon roof (sun roof) of the vehicle 10, and outputs direct current.

Although not shown in the drawing, when an inverter is mounted on the vehicle 10 and the inverter converts direct-current power, which is output from the electrical storage device 300, to commercial alternating-current power (for example, AC 100 V) and then supplies the commercial alternating-current power to an in-vehicle receptacle, the inverter may also be used in any one of the alternating-current power supply units 520, 520', 520".

Figure 8:
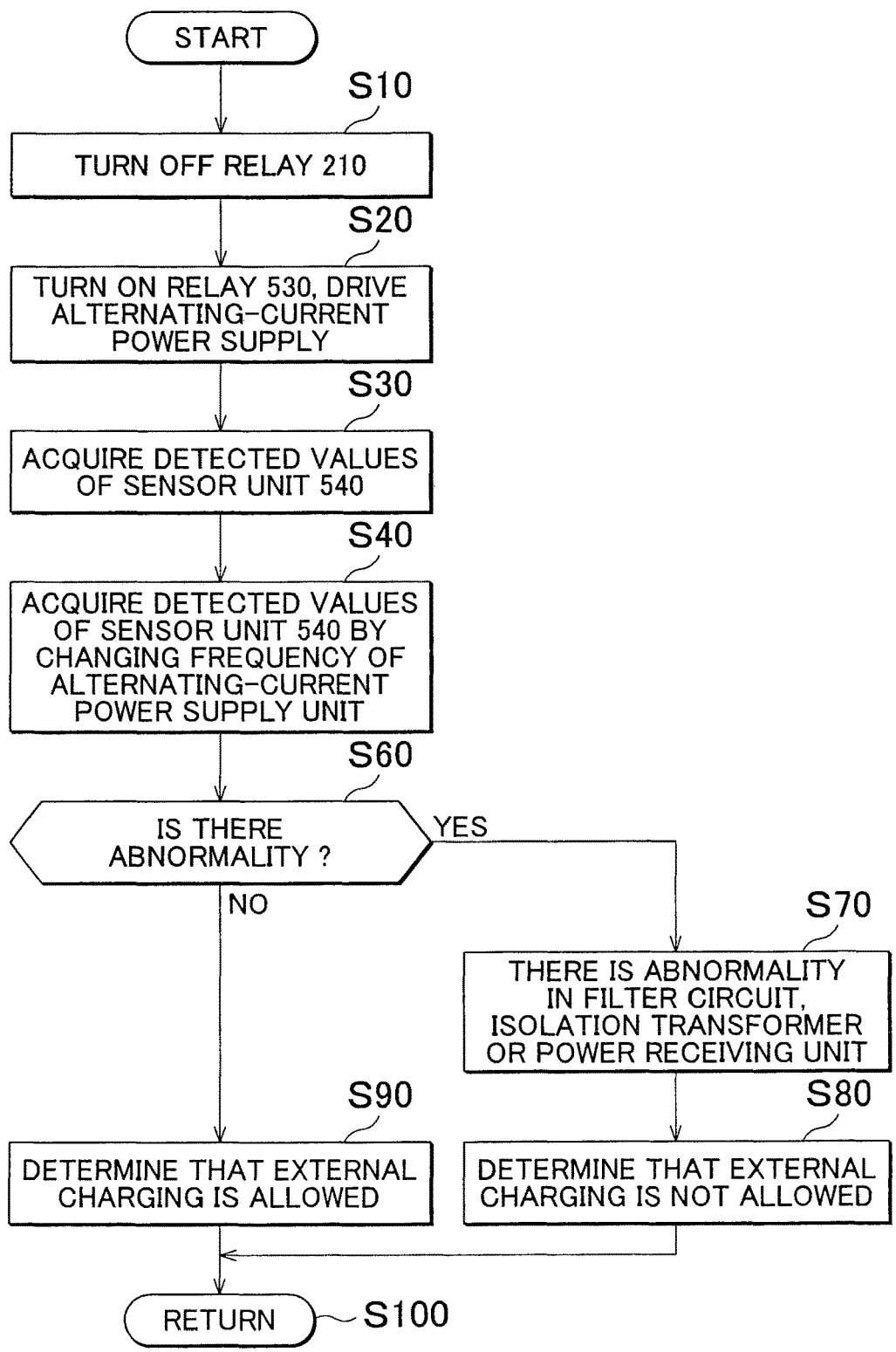
FIG. 8 is a flowchart that illustrates a first procedure of detecting whether there is an abnormality in a power receiving device, which is executed by a vehicle, ECU, according to the first embodiment.

Next, the process of detecting whether there is an abnormality in the power receiving device will be described. FIG. 8 is a flowchart that illustrates a first procedure of detecting whether there is an abnormality in the power receiving device, which is executed by the vehicle ECU 500. The process shown in this flowchart is, for example, executed before the start of transmission of electric power from the power transmitting device 20 to the vehicle 10, and the process detects whether there is an abnormality in the filter circuit 150, the isolation transformer 120 or the power receiving unit 100. A process (described later) shown in FIG. 9 detects whether there is an abnormality in the rectifier circuit 200. The flowchart shown in FIG. 8 is implemented by executing a program prestored in the vehicle ECU 500. Alternatively, for part of steps, the process may be implemented by constructing exclusive hardware (electronic circuit).

As shown in FIG. 1 together with FIG. 8, the vehicle ECU 500 turns off the relay 210 (step S10). When the relay 210 is turned off and the power receiving device, including the power receiving unit 100, the isolation transformer 120, the filter circuit 150 and the rectifier circuit 200, is electrically isolated from the electrical storage device 300, the vehicle ECU 500 turns on the relay 530, and drives the alternating-current power supply unit 520 (step S20). Thus, alternating current (frequency: f1) for detecting an abnormality is supplied from the alternating-current power supply unit 520 to the power receiving device.

When alternating current is supplied from the alternating-current power supply unit 520 to the power receiving device, the vehicle ECU 500 acquires the detected values of the sensor unit 540 (step S30). A root-mean-square value of alternating-current voltage detected by the voltage sensor 542 and a root-mean-square value of alternating current detected by the current sensor 544 are acquired. The acquired root-mean-square values of alternating-current voltage and alternating current are temporarily stored in the vehicle ECU 500.

Subsequently, the vehicle ECU 500 further acquires the detected values of the sensor unit 540 by changing the frequency of the alternating-current power supply unit 520 from f1 to f2 (step S40). A root-mean-square value of alternating-current voltage that is detected by the voltage sensor 542 and a root-mean-square value of alternating current that is detected by the current sensor 544 are acquired again.

The vehicle ECU 500 determines whether there is an abnormality in any one of the filter circuit 150, the isolation transformer 120 and the power receiving unit 100 of the power receiving device based on the detected values of the sensor unit 540, acquired in step S30, and the detected values of the sensor unit 540, acquired in step S40 (step S60). This determination as to whether there is an abnormality is carried out in the following manner.

That is, a predetermined alternating-current voltage is applied from the alternating-current power supply unit 520, and, when the root-mean-square value of alternating current detected by the current sensor 544 is different from an assumed value (designed value), it may be determined that there is an abnormality in at least one among the coils and the capacitors that are included in the filter circuit 150, the isolation transformer 120 or the power receiving unit 100 of the power receiving device. That is, when there occurs an abnormality in any one of the coils, the inductance of that coil changes, with the result that the impedance of the coil changes. When there occurs an abnormality in any one of the capacitors as well, the capacitance of that capacitor changes, with the result that the impedance of the capacitor changes. Thus, when there occurs an abnormality in at least one among the coils and the capacitors that are included in the filter circuit 150, the isolation transformer 120 or the power receiving unit 100, the impedance of the abnormal coil and/or capacitor changes, with the result that the alternating current that is detected by the current sensor 544 changes from the assumed value (designed value). Therefore, it may be determined whether there is an abnormality in at least one among the coils and the capacitors that are included in the filter circuit 150, the isolation transformer 120 or the power receiving unit 100 based on the alternating current that is detected by the current sensor 544. In the case where a coil includes a core, when there occurs an abnormality, such as a crack, in the core, the inductance of the coil can change. The capacitance of a capacitor generally decreases with aged degradation.

In this way, according to the first embodiment, it is possible to detect an abnormality (a change in inductance) of any one of the coils included in the filter circuit 150, the isolation transformer 120 or the power receiving unit 100 together with an abnormality (a change in capacitance) of any one of the capacitors included in the filter circuit 150, the isolation transformer 120 or the power receiving unit 100 of the power receiving device.

Further acquiring the detected value of the current sensor 544 by changing the frequency of the alternating-current power supply unit 520 in step S40 is to increase the reliability of abnormality detection. That is, because the detected value of the current sensor 544 is a value based on the synthetic impedance of the coils and capacitors included in the power receiving device, the synthetic impedance can indicate a normal value at a certain frequency irrespective of a situation that there is an abnormality in both at least one of the coils and at least one of the capacitors. Therefore, alternating currents respectively having different frequencies are applied from the alternating-current power supply unit 520 to the power receiving device, and abnormality detection is carried out based on the detected values of the current sensor 544 at the different frequencies. Thus, it is possible to increase the reliability of abnormality detection.

The detected values of the sensor unit 540 are acquired at two different frequencies; instead, the detected values of the sensor unit 540 may be acquired at three or more different frequencies. On the other hand, carrying out abnormality detection by acquiring the detected values of the sensor unit 540 at such different frequencies is not indispensable matter. That is, although not shown in the drawing, the process shown in step S40 may be omitted. It is assumed to be a rare case where there occurs such an abnormality that the synthetic impedance indicates a normal value although there is an abnormality in both at least one of the coils and at least one of the capacitors.

Because the rectifier circuit 200 includes the rectifier, such as the diode bridge circuit, it is not possible to detect an abnormality in the rectifier circuit 200 (specifically, an abnormality in the capacitor 202 provided on the output side of the rectifier) by using the sensor unit 540 provided on the alternating-current side of the rectifier circuit 200. Whether there is an abnormality in the rectifier circuit 200 is detected based on the detected values of the sensor unit 550 provided on the output side of the rectifier circuit 200 as will be described later.

When it is determined in step S60 that there is an abnormality based on the detected values of the sensor unit 540 (YES in step S60), the vehicle ECU 500 determines that there is an abnormality in the filter circuit 150, the isolation transformer 120 or the power receiving unit 100 (step S70). The vehicle ECU 500 determines that charging (external charging) of the electrical storage device 300 from the power transmitting device 20 is not allowed (step S80).

On the other hand, when it is determined in step S60 that there is no abnormality (NO in step S60), the vehicle ECU 500 determines that charging (external charging) of the electrical storage device 300 from the power transmitting device 20 is allowed (step S90). Even when it is determined in step S90 that external charging is allowed, but when it is determined that there is an abnormality in the rectifier circuit 200 in the process (described later) of detecting whether there is an abnormality in the rectifier circuit 200 (FIG. 9), external charging is not carried out.

Figure 9:
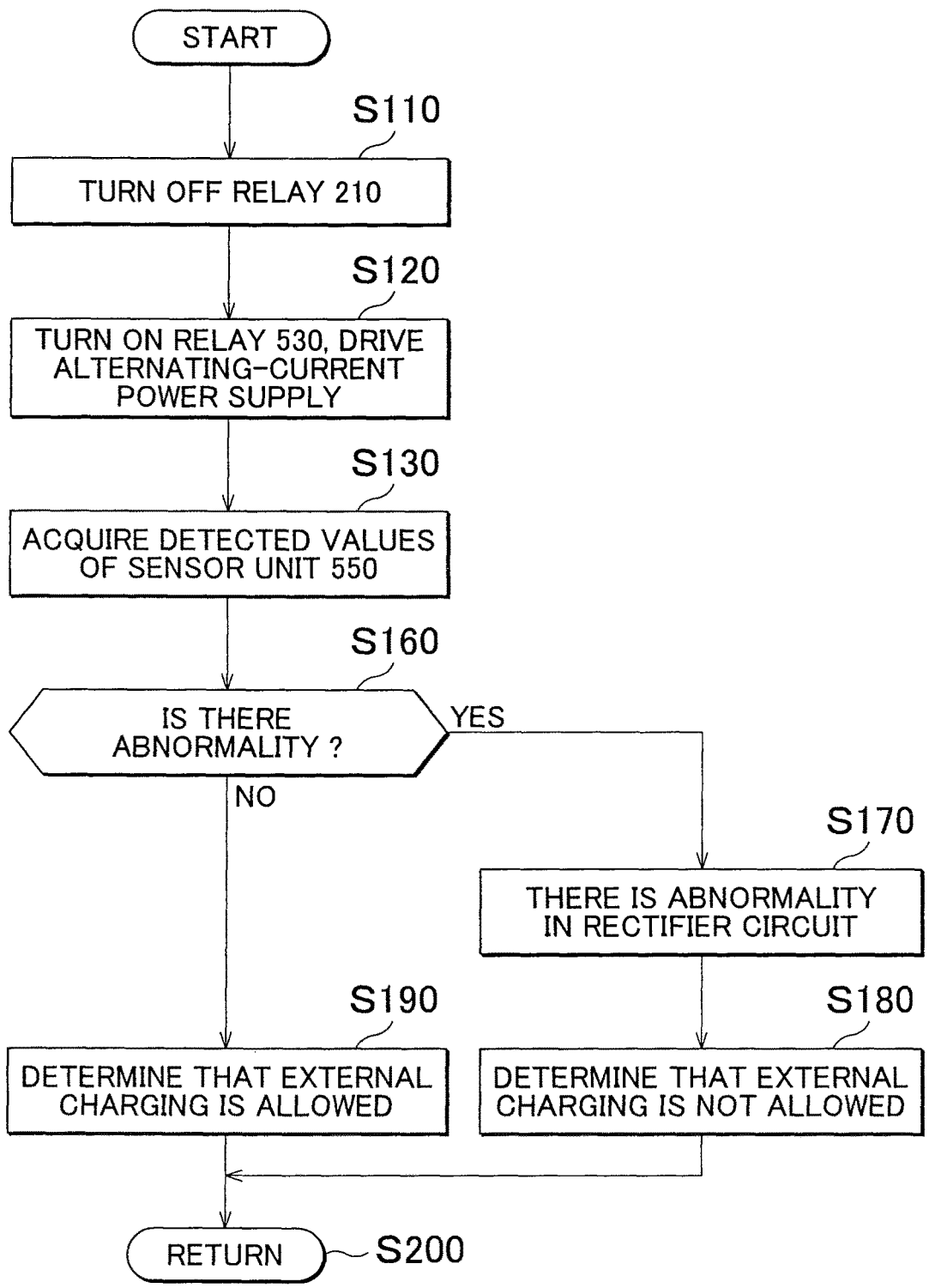
FIG. 9 is a flowchart that illustrates a second procedure of detecting whether there is an abnormality in the power receiving device, which is executed by the vehicle ECU, according to the first embodiment.

FIG. 9 is a flowchart that illustrates a second procedure of detecting whether there is an abnormality in the power receiving device, which is executed by the vehicle ECU 500. The process shown in the flowchart is basically executed in parallel with the process shown in the flowchart of FIG. 8. The process shown in the flowchart detects whether there is an abnormality in the rectifier circuit 200. The flowchart shown in FIG. 9 is also implemented by executing a program prestored in the vehicle ECU 500. Alternatively, for part of steps, the process may be implemented by constructing exclusive hardware (electronic circuit).

As shown in FIG. 1 together with FIG. 9, the vehicle ECU 500 turns off the relay 210 (step S110). In addition, the vehicle ECU 500 turns on the relay 530, and drives the alternating-current power supply unit 520 (step S120). The processes of step S110 and step S210 are respectively the same as the processes of step S10 and step S20 shown in FIG. 8.

Subsequently, the vehicle ECU 500 acquires the detected values of the sensor unit 550 (step S130). Specifically, a direct-current voltage that is detected by the voltage sensor 552 and a direct current that is detected by the current sensor 554 are acquired.

The vehicle ECU 500 determines whether there is an abnormality in the rectifier circuit 200 of the power receiving device based on the detected values of the sensor unit 550, acquired in step S130 (step S160). Specifically, depending on whether a time required until an accumulated value of direct current that is detected by the current sensor 554 reaches a predetermined threshold is different from an assumed value (designed value), it may be determined whether the capacitance of the capacitor 202 included in the rectifier circuit 200 has changed.

When it is determined in step S160 that there is an abnormality based on the detected values of the sensor unit 550 (YES in step S160), the vehicle ECU 500 determines that there is an abnormality in the rectifier circuit 200 (step S170). The vehicle ECU 500 determines that charging (external charging) of the electrical storage device 300 from the power transmitting device 20 is not allowed (step S180).

On the other hand, when it is determined in step S160 that there is no abnormality (NO in step S160), the vehicle ECU 500 determines that charging (external charging) of the electrical storage device 300 from the power transmitting device 20 is allowed (step S190). Even when it is determined in step S190 that external charging is allowed, but when it is determined in step S80 shown in FIG. 8 that external charging is not allowed, external charging is not carried out.

Although not shown in the drawing, the process shown in FIG. 8 and the process shown in FIG. 9 may be executed in one routine, and the processes of step S10, step S20, step S80, step S90 shown in FIG. 8 may be respectively commonalized with the processes of step S110, step S120, step S180, step S190 shown in FIG. 9.

As described above, in the first embodiment, the alternating-current power supply unit 520 is electrically connected to the power lines provided closer to the power receiving unit 100 than the relay 210, and whether there is an abnormality in the power receiving device can be detected by the vehicle alone even not during reception of electric power from the power transmitting device 20. Because alternating current is supplied from the alternating-current power supply unit 520, an abnormality in any one of the coils can be detected based on a change in the impedance of the any one of the coils. Thus, according to the first embodiment, it is possible to detect whether there is an abnormality in the power receiving device by the vehicle alone, and it is possible to also detect whether there is an abnormality in any one of the coils together with an abnormality in any one of the capacitors.

Next, a second embodiment will be described. In the second embodiment, the configuration of the power receiving device that is able to detect whether there is an abnormality in the power receiving unit 100 of the power receiving device will be described.

Figure 10:
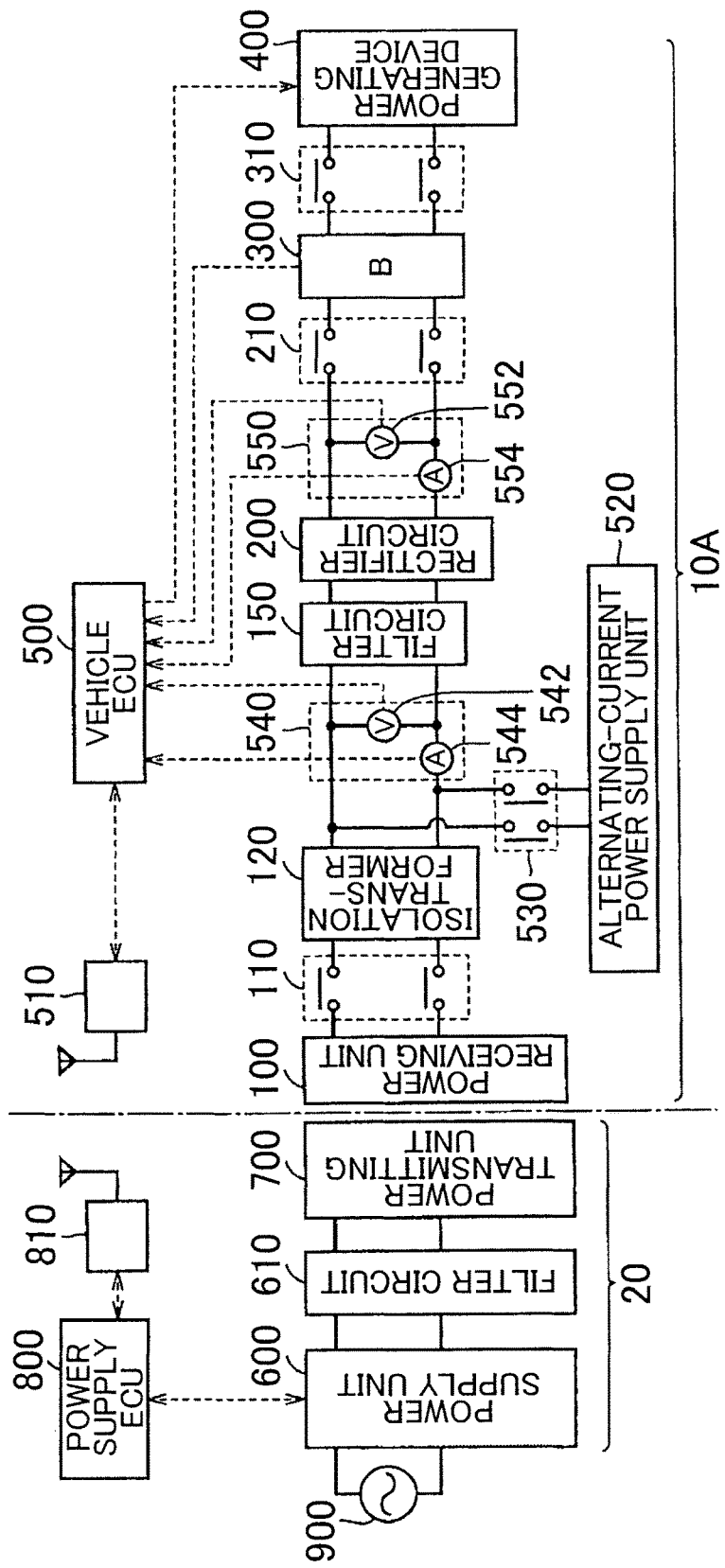
FIG. 10 is an overall configuration view of a power transfer system according to a second embodiment.

FIG. 10 is an overall configuration view of a power transfer system according to the second embodiment. As shown in FIG. 10, a vehicle 10A further includes a relay 110 in addition to the configuration of the vehicle 10 shown in FIG. 1. The relay 110 is provided between the power receiving unit 100 and the isolation transformer 120. The relay 110 is turned on by the vehicle ECU 500 when electric power is transferred from the power transmitting device 20 to the vehicle 10A (during external charging). On the other hand, when the process of detecting an abnormality in the power receiving device, which is executed in advance of external charging, is executed, the relay 110 is switched by the vehicle ECU 500 between the on state and the off state.

The other configuration of the vehicle 10A is the same as that of the vehicle 10 shown in FIG. 1. In the vehicle 10A as well, the isolation transformer 120 is not an indispensable component, and is provided where necessary.

Figure 11:
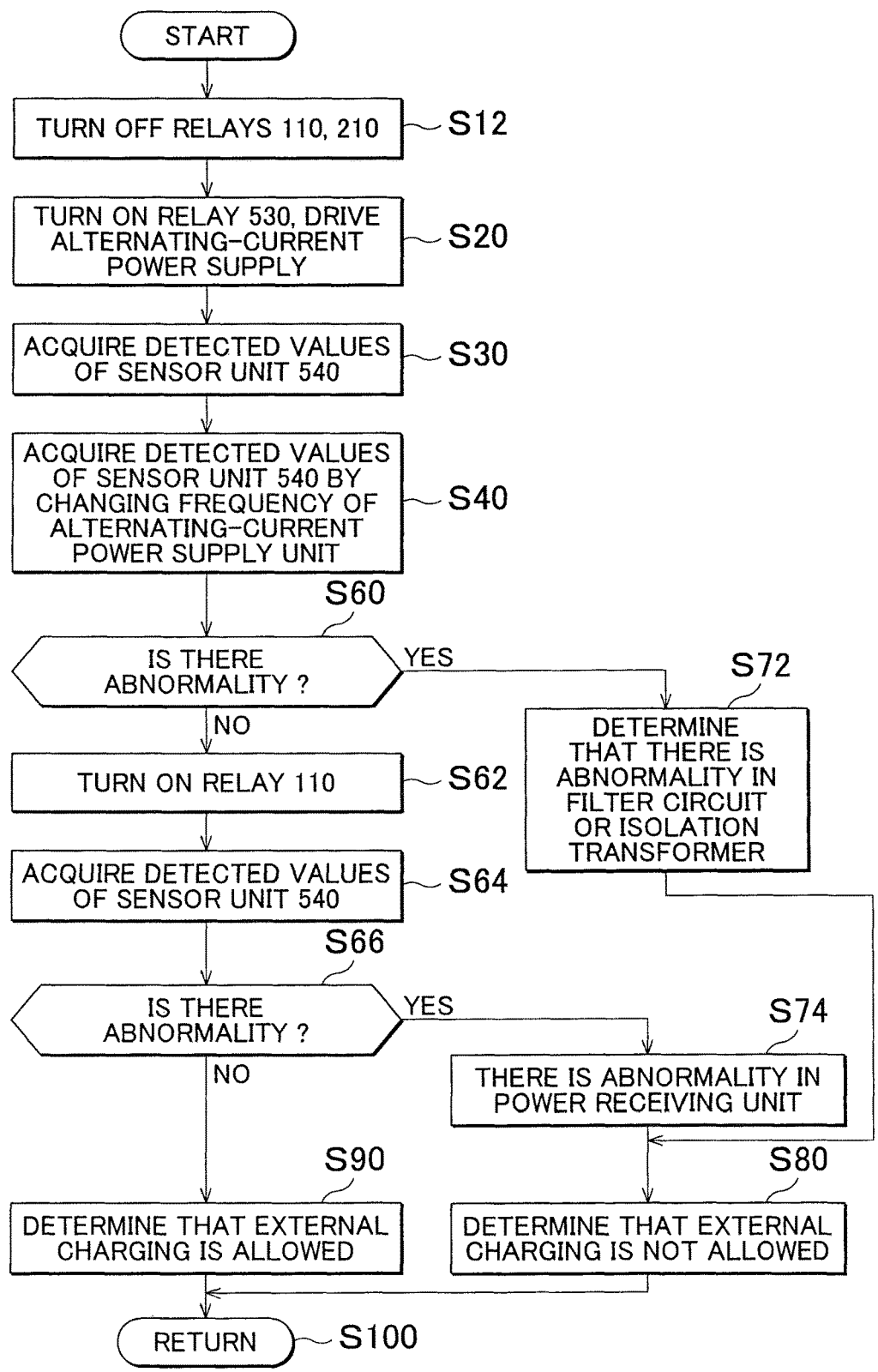
FIG. 11 is a flowchart that illustrates a first procedure of detecting whether there is an abnormality in a power receiving device, which is executed by a vehicle ECU, according to the second embodiment.

FIG. 11 is a flowchart that illustrates the first procedure of detecting whether there is an abnormality in the power receiving device, which is executed by the vehicle ECU 500, according to the second embodiment. The flowchart corresponds to the flowchart shown in FIG. 8 for detecting whether there is an abnormality in the power receiving device according to the first embodiment. The process shown in FIG. 9 detects whether there is an abnormality in the rectifier circuit 200.

As shown in FIG. 10 together with FIG. 11, the vehicle ECU 500 turns off the relay 110 together with the relay 210 (step S12). Thus, the power receiving device is electrically isolated from the electrical storage device 300, and the power receiving unit 100 is further electrically isolated from the isolation transformer 120. After that, the process proceeds to step S20, the vehicle ECU 500 turns on the relay 530, and the alternating-current power supply unit 520 is driven. Step S20 to step S60 are described with reference to FIG. 8, so the description thereof will not be repeated.

When it is determined in step S60 that there is an abnormality based on the detected values of the sensor unit 540 (YES in step S60), the vehicle ECU 500 determines that there is an abnormality in the filter circuit 150 or the isolation transformer 120 (step S72). Because the relay 110 is turned off, whether there is an abnormality in the power receiving unit 100 is not detected. After the process of step S72, the process proceeds to step S80, and it is determined that external charging is not allowed.

On the other hand, when it is determined in step S60 that there is no abnormality (NO in step S60), the vehicle ECU 500 turns on the relay 110 (step S62). Thus, the power receiving unit 100 is electrically connected to the isolation transformer 120, and alternating current for detecting an abnormality is supplied from the alternating-current power supply unit 520 to the power receiving unit 100. The vehicle ECU 500 acquires the detected values of the sensor unit 540 again (step S64), and determines whether there is an abnormality in the power receiving unit 100 of the power receiving device based on the acquired detected values of the sensor unit 540 (step S66).

When it is determined in step S66 that there is an abnormality based on the detected values of the sensor unit 540 (YES in step S66), the vehicle ECU 500 determines that there is an abnormality in the power receiving unit 100 (step S74). After that, the process proceeds to step S80, it is determined that external charging is not allowed. On the other hand, when it is determined in step S66 that there is no abnormality (NO in step S66), the process proceeds to step S90, and it is determined that external charging is allowed.

Although not shown in the drawing, in the process of detecting in step S64 or step S66 whether there is an abnormality in the power receiving unit 100 as well, the detected values of the sensor unit 540 may be acquired by changing the frequency of the alternating-current power supply unit 520, and the reliability of abnormality detection may be increased by detecting an abnormality based on the detected values of the sensor unit 540 having different frequencies.

As described above, in the second embodiment, the power receiving unit 100 is electrically isolated from the device unit downstream of the isolation transformer 120 by the relay 110, and it is detected whether there is an abnormality in the device unit. Thus, according to the second embodiment, it is possible to detect whether there is an abnormality in the device unit downstream of the isolation transformer 120 as distinguished from the power receiving unit 100. According to the second embodiment, it is possible to further detect whether there is an abnormality in the power receiving unit 100 as distinguished from the device unit downstream of the isolation transformer 120.

Figure 12:
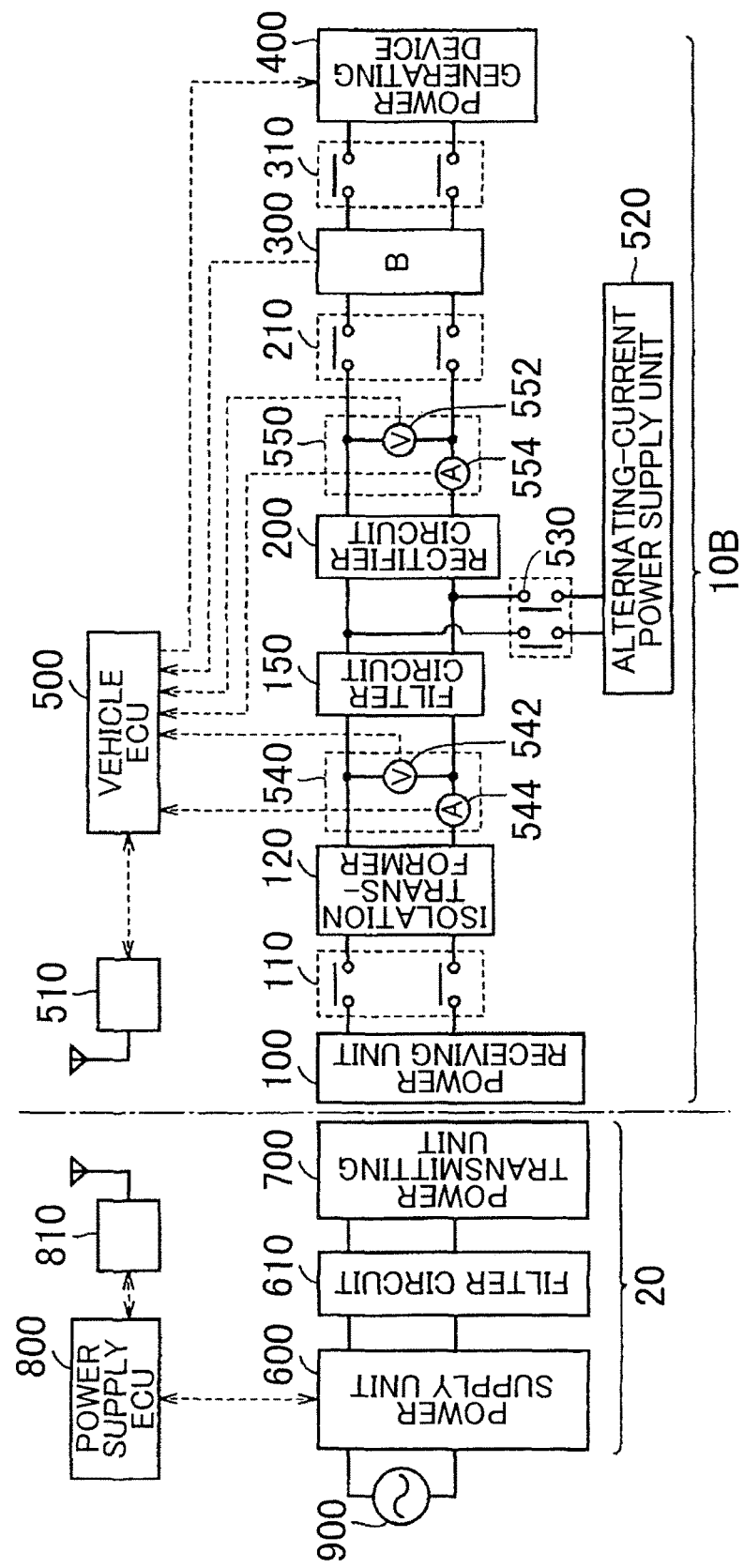
FIG. 12 is an overall configuration view of a power transfer system according to an alternative embodiment to the second embodiment.

Next, an alternative embodiment to the second embodiment will be described. FIG. 12 is an overall configuration view of a power transfer system according to the alternative embodiment to the second embodiment. As shown in FIG. 12, a vehicle 10B differs from the vehicle 10A in that the alternating-current power supply unit 520 is electrically connected to the pair of power lines between the filter circuit 150 and the rectifier circuit 200. The other configuration of the vehicle 10B is the same as that of the vehicle 10A. The sensor unit 540 may also be provided in the pair of power lines between the filter circuit 150 and the rectifier circuit 200.

Although not shown in the drawing, in the configuration of the first embodiment shown in FIG. 1 as well, the alternating-current power supply unit 520 may be electrically connected via the relay 530 to the pair of power lines between the filter circuit 150 and the rectifier circuit 200.

Next, a third embodiment will be described. In the above-described first embodiment, second embodiment and alternative embodiment to the second embodiment, the alternating-current power supply units 520, 520', 520" each are electrically connected to the input side (alternating-current side) of the rectifier circuit 200. Instead, in the third embodiment, the alternating-current power supply unit 520 is electrically connected to the output side (direct-current side) of the rectifier circuit 200.

Figure 13:
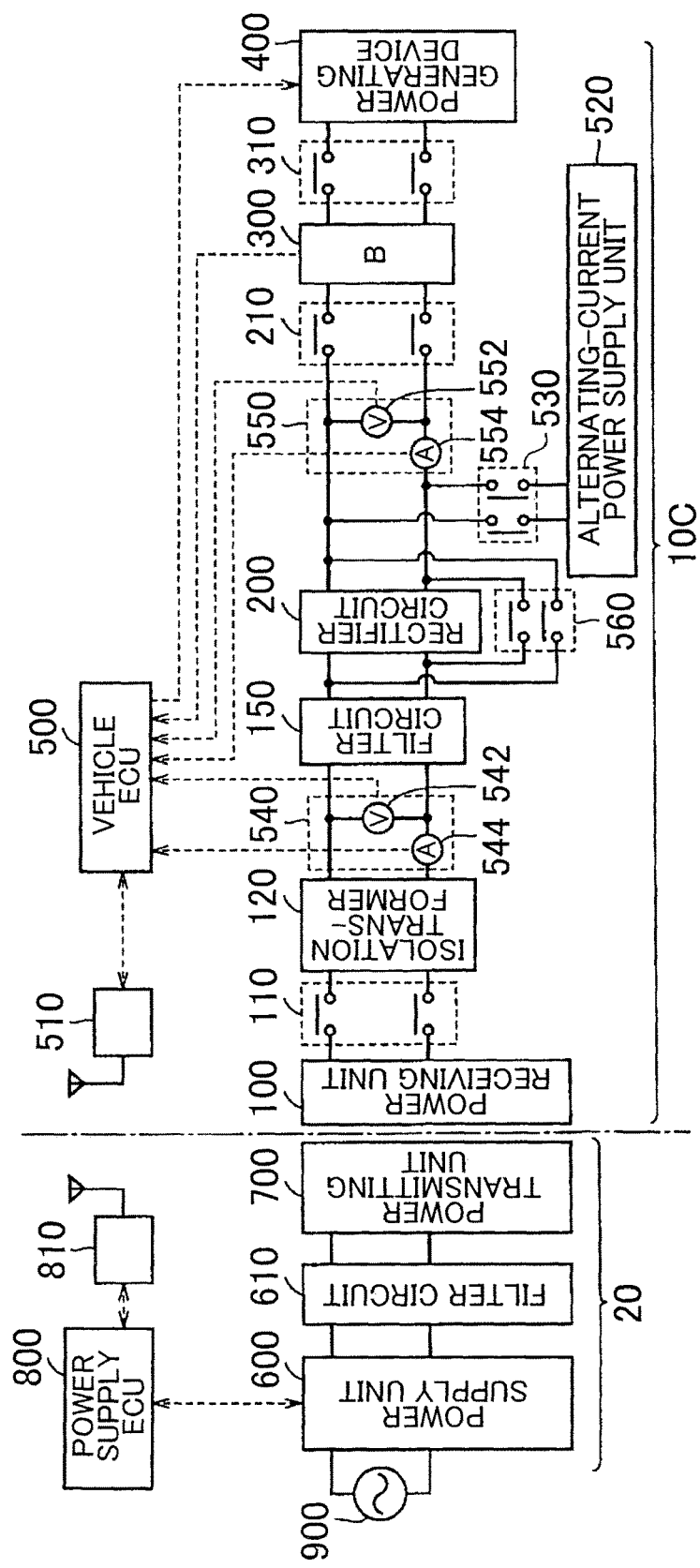
FIG. 13 is an overall configuration view of a power transfer system according to a third embodiment.

FIG. 13 is an overall configuration view of a power transfer system according to the third embodiment. As shown in FIG. 13, a vehicle 10C differs from the vehicle 10A in that the alternating-current power supply unit 520 is electrically connected to the pair of power lines between the rectifier circuit 200 and the relay 210. The vehicle 10C further includes a bypass circuit and a relay 560. The bypass circuit bypasses the rectifier circuit 200. The other configuration of the vehicle 10C is the same as that of the vehicle 10A.

The relay 560 is provided in power lines that bypass between the output side (direct-current side) and input side of the rectifier circuit 200, and is switched by the vehicle ECU 500 between an on state and an off state. By supplying alternating current from the alternating-current power supply unit 520 in a state where the relay 560 is turned off, it is possible to detect whether there is an abnormality in the rectifier circuit 200 (specifically, whether there is an abnormality in the capacitor 202 provided on the output side of the rectifier).

By turning on the relay 560, it is possible to detect whether there is an abnormality in the filter circuit 150, the isolation transformer 120 or the power receiving unit 100, which is provided on the input side (alternating-current side) of the rectifier circuit 200. In addition, by switching the relay 110 between the on state and the off state, it is possible to distinguish abnormality detection as to the power receiving unit 100 from abnormality detection as to the isolation transformer 120 or the filter circuit 150.

Figure 14A:
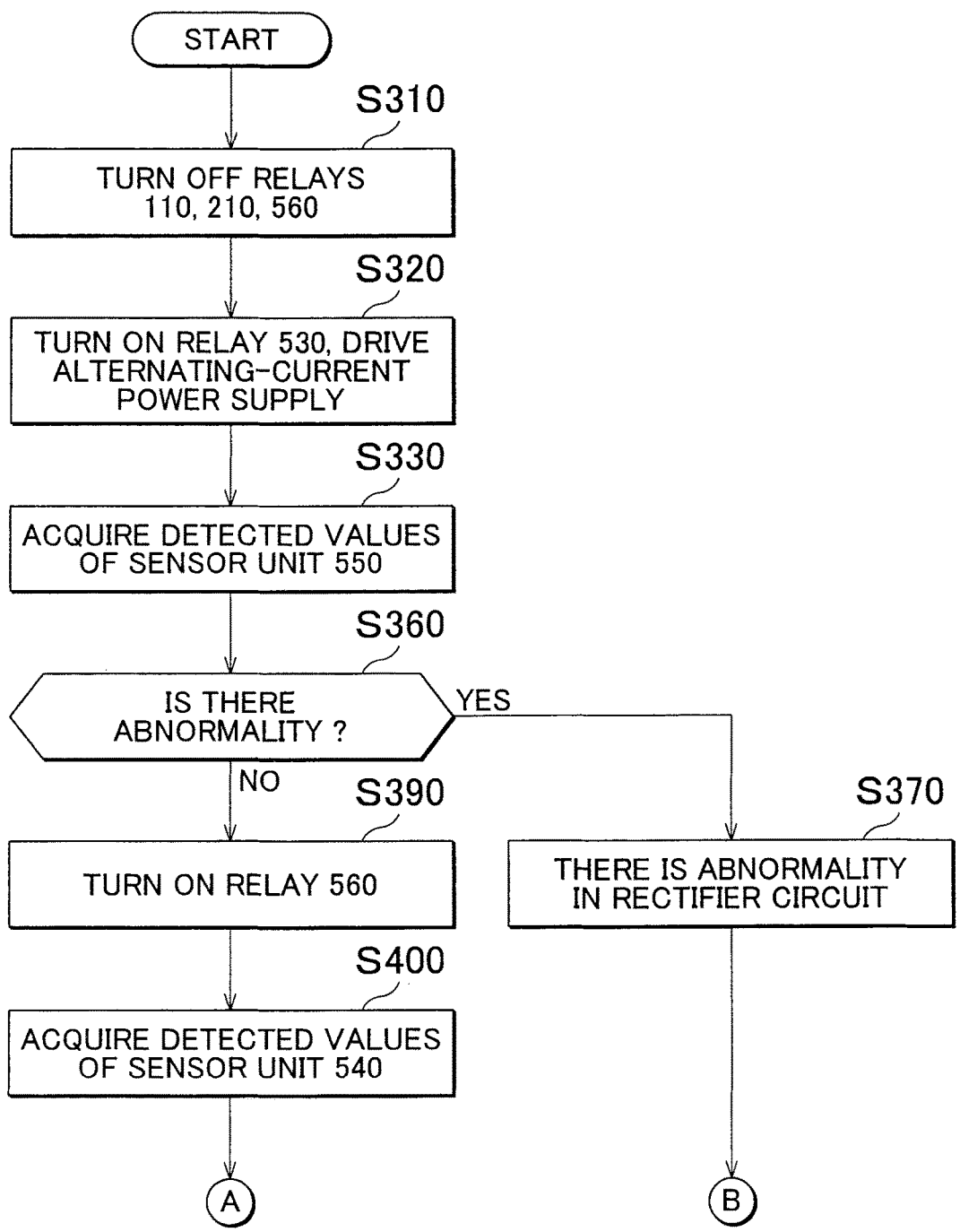
FIG. 14A and FIG. 14B are flowcharts that illustrates a procedure of detecting whether there is an abnormality in a power receiving device, which is executed by a vehicle ECU, according to the third embodiment.
Figure 14B:
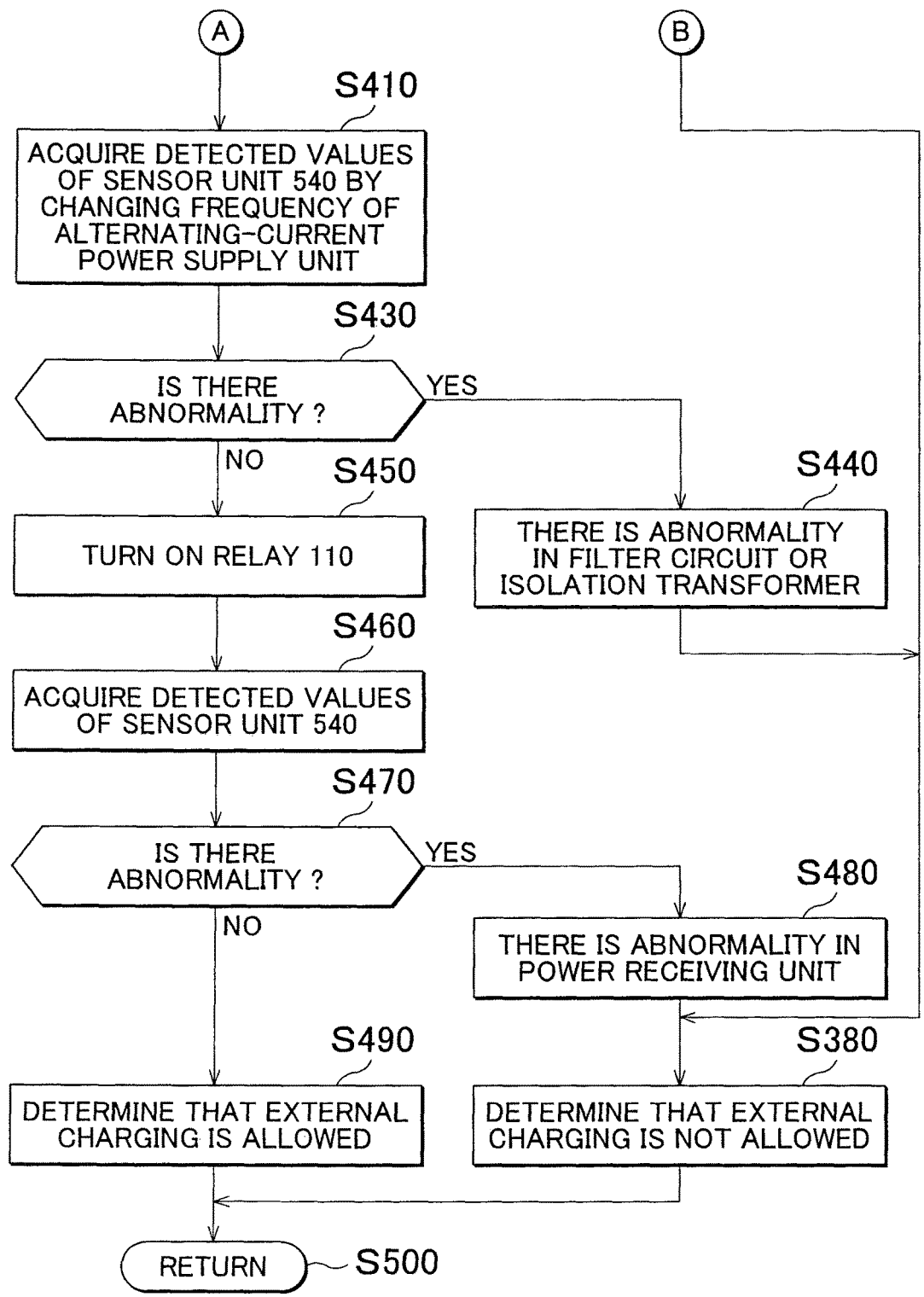

FIG. 14A and FIG. 14B are flowcharts that illustrate procedures of detecting whether there is an abnormality in the power receiving device, which is executed by the vehicle ECU 500, according to the third embodiment. The process shown in the flowchart is also executed, for example, before the start of transmission of electric power from the power transmitting device 20 to the vehicle 10C. The flowchart shown in FIG. 14A and FIG. 14B are also implemented by executing a program prestored in the vehicle ECU 500. Alternatively, for part of steps, the process may be implemented by constructing exclusive hardware (electronic circuit).

As shown in FIG. 13 together with FIG. 14A and FIG. 14B, the vehicle ECU 500 turns off the relays 110, 210, 560 (step S310). Thai is, the bypass circuit for bypassing the rectifier circuit 200 is interrupted, and the power receiving unit 100 is electrically isolated from the isolation transformer 120. The vehicle ECU 500 turns on the relay 530, and drives the alternating-current power supply unit 520 (step S320). Thus, alternating current for detecting an abnormality is supplied from the alternating-current power supply unit 520 to the power receiving device.

Subsequently, the vehicle ECU 500 acquires the detected values of the sensor unit 550 (step S330). Specifically, a direct-current voltage that is detected by the voltage sensor 552 and a direct current that is detected by the current sensor 554 are acquired.

The vehicle ECU 500 determines whether there is an abnormality in the rectifier circuit 200 of the power receiving device based on the detected values of the sensor unit 550, acquired in step S330 (step S360). The process that is executed in step S360 is the same as the process that is executed in step S160 shown in FIG. 9. Specifically, in step S360, it is detected whether there is an abnormality (a change in capacitance) in the capacitor 202 included in the rectifier circuit 200.

When it is determined in step S360 that there is an abnormality based on the detected values of the sensor unit 550 (YES in step S360), the vehicle ECU 500 determines that there is an abnormality in the rectifier circuit 200 (step S370). The vehicle ECU 500 determines that charging (external charging) of the electrical storage device 300 from the power transmitting device 20 is not allowed (step S380).

On the other hand, when it is determined in step S360 that there is no abnormality (NO in step S360), the vehicle ECU 500 turns on the relay 560 (step S390). Thus, the rectifier circuit 200 is bypassed, and alternating current is supplied from the alternating-current power supply unit 520 to the filter circuit 150 and the isolation transformer 120.

The process that is executed from step S400 is the same as the process that is executed from step S30 according to the second embodiment shown in FIG. 11, so the description will not be repeated.

In the above description, in the configuration of the vehicle 10A according to the second embodiment, the alternating-current power supply unit 520 is connected to the output side (direct-current side) of the rectifier circuit 200. Instead, in the configuration of the vehicle 10 according to the first embodiment, the alternating-current power supply unit 520 may be connected to the output side (direct-current side) of the rectifier circuit 200. That is, the third embodiment is also applicable to a configuration in which no relay 110 is provided.

As described above, according to the third embodiment as well, similar advantageous effects to those of the first embodiment or the second embodiment are obtained.

In the above description, the power receiving unit 100, the isolation transformer 120, the filter circuit 150 and the rectifier circuit 200 constitute an example of the "module" according to the invention. Of these, the filter circuit 150 and the rectifier circuit 200 constitute an example of the "device unit" according to the invention. The relay 210 corresponds to one embodiment of a "first relay" according to the invention. The relay 110 corresponds to one embodiment of a "second relay" according to the invention. In addition, the current sensor 544 corresponds to one embodiment of a "first current sensor" according to the invention, and the current sensor 554 corresponds to one embodiment of a "second current sensor" according to the invention. Furthermore, the vehicle ECU 500 corresponds to one embodiment of an "electronic control unit" according to the invention, and the relay 560 corresponds to one embodiment of a "third relay" according to the invention.

The invention claimed is:

1. A power receiving device comprising:
a module including a power receiving unit and a device unit, the power receiving unit including a first coil and a first capacitor, the power receiving unit being configured to contactlessly receive electric power that is output from a power transmitting device, the device unit including a second coil and a second capacitor, the device unit being provided between the power receiving unit and an electrical storage device, the electrical storage device being configured to store electric power received by the power receiving unit;
a first relay provided between the device unit and the electrical storage device;
an alternating-current power supply unit configured to supply alternating current to a power line provided closer to the power receiving unit than the first relay;
a current sensor configured to detect a current flowing through the power line; and
an electronic control unit configured to, when alternating current is supplied from the alternating-current power supply unit to the power line in a case where the first relay is in a power interrupted state, detect whether there is an abnormality in at least one of the first coil, the first capacitor, the second coil and the second capacitor based on a detected value of the current sensor.

2. The power receiving device according to claim 1, further comprising:
a second relay provided between the power receiving unit and the device unit, wherein
the alternating-current power supply unit is electrically connected between the first relay and the second relay,
the current sensor is configured to detect a current flowing through a power line provided between the first relay and the second relay, and
the electronic control unit is configured to, when alternating current is supplied from the alternating-current power supply unit in a case where the first relay and the second relay are in a power interrupted state, detect whether there is an abnormality in at least one of the second coil and the second capacitor based on the detected value of the current sensor.

3. The power receiving device according to claim 2, wherein
the electronic control unit is configured to, after the electronic control unit detects that there is no abnormality in the second coil or the second capacitor, set the second relay in an energized state and detect whether there is an abnormality in at least one of the first coil and the first capacitor based on the detected value of the current sensor.

4. The power receiving device according to claim 2, wherein
the device unit includes a rectifier circuit and a filter circuit, the rectifier circuit is configured to rectify electric power received by the power receiving unit, the filter circuit is provided between the power receiving unit and the rectifier circuit,
the second coil and the second capacitor are included in the filter circuit,
the device unit further includes a third capacitor provided in the rectifier circuit,
the current sensor includes a first current sensor and a second current sensor, the first current sensor is configured to detect a current flowing through a power line provided between the second relay and the rectifier circuit, the second current sensor is configured to detect a current flowing through a power line provided between the rectifier circuit and the first relay,
the alternating-current power supply unit is electrically connected to a power line provided between the second relay and the filter circuit, and
the electronic control unit is configured to detect whether there is an abnormality in the filter circuit or the power receiving unit based on a detected value of the first current sensor, and the electronic control unit is configured to detect whether there is an abnormality in the rectifier circuit based on a detected value of the second current sensor.

5. The power receiving device according to claim 2, wherein
the device unit includes a rectifier circuit and a filter circuit, the rectifier circuit is configured to rectify electric power received by the power receiving unit, the filter circuit is provided between the power receiving unit and the rectifier circuit,
the second coil and the second capacitor are included in the filter circuit,
the device unit further includes a third capacitor provided in the rectifier circuit,
the current sensor includes a first current sensor and a second current sensor, the first current sensor is configured to detect a current flowing through a power line provided between the second relay and the rectifier circuit, the second current sensor is configured to detect a current flowing through a power line provided between the rectifier circuit and the first relay,
the alternating-current power supply unit is electrically connected to a power line provided between the filter circuit and the rectifier circuit, and
the electronic control unit is configured to detect whether there is an abnormality in the filter circuit or the power receiving unit based on a detected value of the first current sensor, and the electronic control unit is configured to detect whether there is an abnormality in the rectifier circuit based on a detected value of the second current sensor.

6. The power receiving device according to claim 2, wherein
the device unit includes a rectifier circuit and a filter circuit, the rectifier circuit is configured to rectify electric power received by the power receiving unit, the filter circuit is provided between the power receiving unit and the rectifier circuit,
the second coil and the second capacitor are included in the filter circuit,
the device unit further includes a third capacitor provided on an output side of a rectifier of the rectifier circuit,
the current sensor includes a first current sensor and a second current sensor, the first current sensor is configured to detect a current flowing through a power line provided between the second relay and the rectifier circuit, the second current sensor is configured to detect a current flowing through a power line provided between the rectifier circuit and the first relay,
the alternating-current power supply unit is electrically connected to the power line provided between the rectifier circuit and the first relay,
the power receiving device includes a bypass circuit and a third relay, the bypass circuit is configured to bypass the rectifier circuit, the third relay is provided in the bypass circuit,
the electronic control unit is configured to detect whether there is an abnormality in the third capacitor based on a detected value of the second current sensor while setting the third relay in a power interrupted state, and the electronic control unit is configured to detect whether there is an abnormality in the filter circuit or the power receiving unit based on a detected value of the first current sensor while setting the third relay in an energized state.

7. The power receiving device according to claim 1, wherein
the alternating-current power supply unit is configured to change a frequency of the alternating current, and
the electronic control unit is configured to detect whether there is an abnormality in the at least one of the first coil, the first capacitor, the second coil and the second capacitor based on the detected values of the current sensor for alternating currents respectively having different frequencies.

8. The power receiving device according to claim 1, wherein
the device unit includes a rectifier circuit, a filter circuit and an isolation transformer, the rectifier circuit is configured to rectify electric power received by the power receiving unit, the filter circuit is provided between the power receiving unit and the rectifier circuit, and the isolation transformer is provided between the power receiving unit and the filter circuit.

* * * * *